United States Patent [19]
Moritz

[11] Patent Number: 5,003,765
[45] Date of Patent: Apr. 2, 1991

[54] GUIDE OR FEEDER CHAIN

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 562,633

[22] Filed: Aug. 3, 1990

[30] Foreign Application Priority Data

Aug. 26, 1989 [DE] Fed. Rep. of Germany ....... 3928233

[51] Int. Cl.$^5$ ............................................. F16G 13/16
[52] U.S. Cl. ...................................... 59/78.1; 248/51
[58] Field of Search ......................... 59/78, 78.1, 900; 248/48, 49, 50, 51, 78

[56] References Cited

U.S. PATENT DOCUMENTS

| 4,590,961 | 5/1986 | Schumann | 59/78.1 |
| 4,800,714 | 1/1989 | Moritz | 59/78.1 |

FOREIGN PATENT DOCUMENTS 0277389 12/1987 European Pat. Off. .
3407169 9/1985 Fed. Rep. of Germany .
3617447 10/1987 Fed. Rep. of Germany .

Primary Examiner—David Jones
Attorney, Agent, or Firm—Robert W. Becker & Associates

[57] ABSTRACT

A guide or feeder chain for power and supply lines is provided. The chain includes chain links that each comprise two spaced-apart link members that are disposed parallel to one another and are interconnected by crosspieces. Link members of adjacent chain links, where they overlap, are held against one another via a pivot lug and a pivot hole. Disposed in each pivot axis is a locking pin that comprises a shaft, on one end of which is formed a head and on the other end of which are formed radially projecting dogs that are disposed opposite one another. Each link member, concentric to a pivot axis, has a locking hole which has radial grooves for receiving the dogs. The grooves, on one side of the link member, has undercuts that extend away from the groove in the circumferential direction of the locking hole for receiving the dogs.

4 Claims, 2 Drawing Sheets

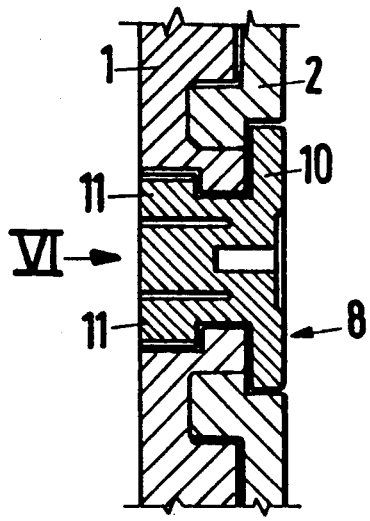
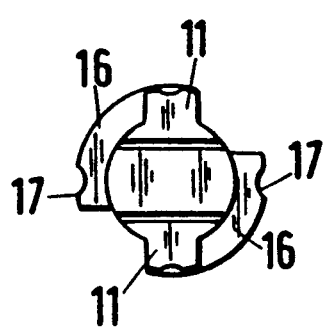
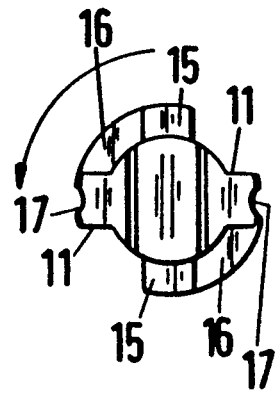
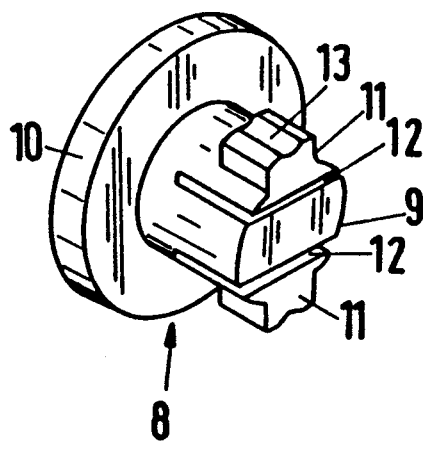
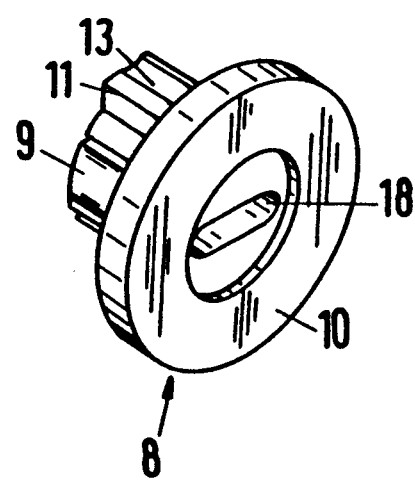

GUIDE OR FEEDER CHAIN

BACKGROUND OF THE INVENTION

The present invention relates to a guide or feeder chain for power and supply lines, and includes chain links that each comprise two spaced-apart link members that are disposed parallel to one another and are interconnected by crosspiece means, whereby link members of adjacent chain links, where they overlap, are held against one another by plastic locking pins.

DE-PS 34 07 169 discloses a guide or feeder chain where the link members, in the overlap zone, are held against one another via a pivot journal or lug and a pivot hole. The pivot journal catches in the pivot hole by means of a snap-type connection. For this purpose, the pivot lug is provided with a plurality of sectors that are separated from one another by slots and that at their free ends have radial grooves that engage rings that project radially inwardly in the pivot hole. With this heretofore known guide or feeder chain, the pivot coupling and the locking element are formed by the same structural components.

DE-PS 36 17 447 discloses a pivot pin that connects a cover with two adjoining link members, and that is disposed in a central bore. This pivot pin does not serve to transfer force, but rather it is completely free of load and is embodied as a screw, as a round bolt with a retaining ring, or as a snap-type connection. A further connecting element, which produces an easily releasable connection between the cover and the link members, is very clearly disclosed as a bayonet-type closure.

EP-OS 0 277 389 discloses a guide or feeder chain where in the overlap region of the link members, the chain links are held together via a pivot pin, the free end of which is provided with a thread.

Proceeding from the above, it is an object of the present invention to provide a guide or feeder chain that has a straightforward construction, and where the assembly of multi-part chain links is facilitated, in particular the connection and release of adjoining link members, without thereby endangering the connection during an operation for which the chain is designed, and also without having to take safety precautions to prevent an undesired automatic rotation.

BRIEF DESCRIPTION OF THE DRAWINGS

This object, and other objects and advantages of the present invention, will appear more clearly from the following specification in conjunction with the accompanied schematic drawings, in which:

FIG. 2 is an elevational view of a locking pin from the inner side;

FIG. 3 is an elevational view of the same locking pin from the outer side;

FIG. 4 is a cross-sectional view through a pivot connection;

FIG. 5 is a view toward a pivot connection from the inner side in a non-locked state; and FIG. 6 is a view taken in the direction of the arrow VI in FIG. 4 showing the pivot connection from the inner side in the locked state.

SUMMARY OF THE INVENTION

Figure 1:
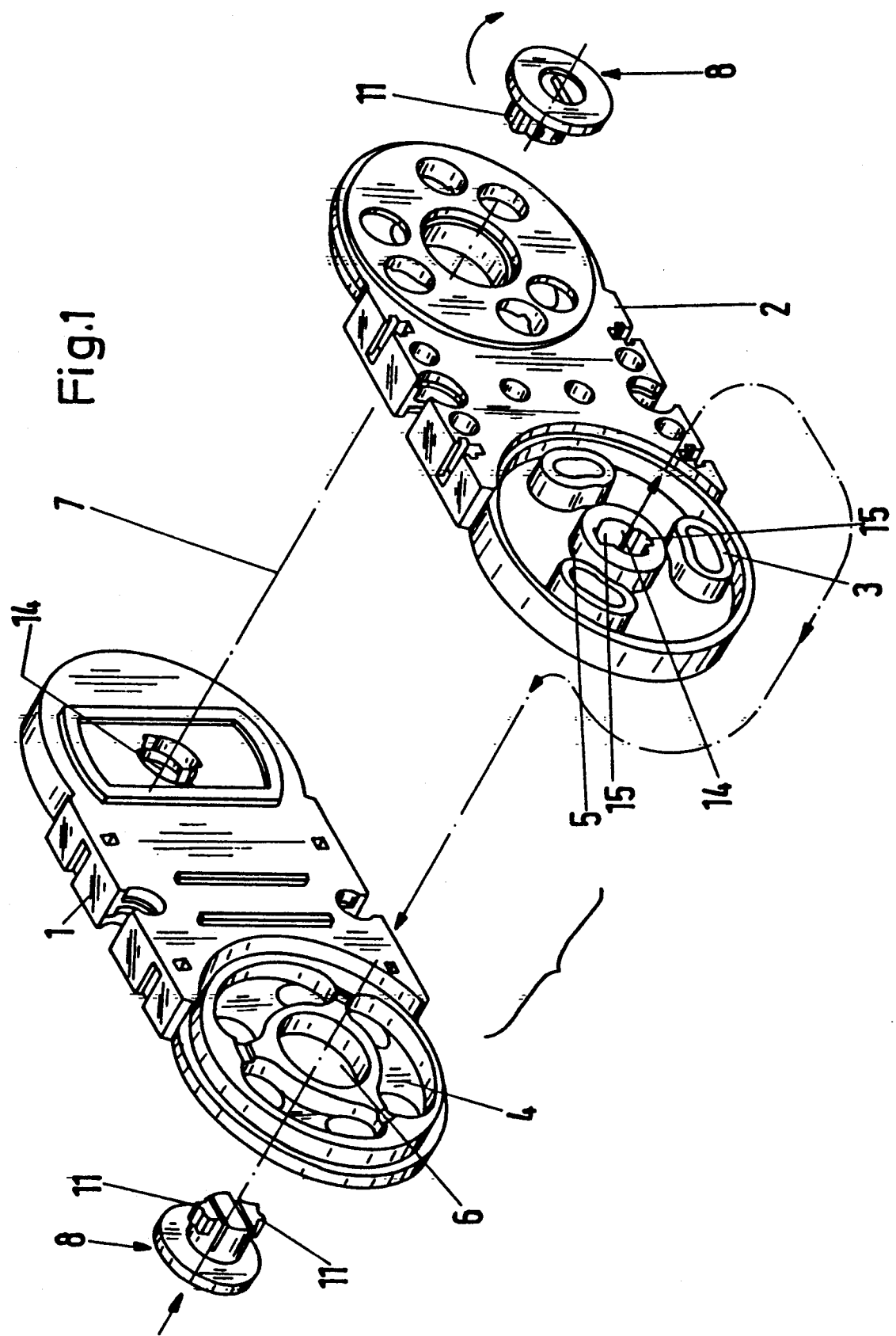
FIG. 1 is an exploded view of one exemplary embodiment of two adjoining chain link members and looking pins.

The guide or feeder chain of the present invention is characterized primarily in that: the locking pin comprises a shaft, on one end of which is formed a head and on the other end of which are formed radially projecting dogs that are disposed opposite one another; each link member, concentric to a pivot axis, has a locking hole which has radial grooves for receiving the dogs; the grooves, on one side of the link member has, undercuts that extend away from the groove in the circumferential direction of the locking hole for receiving the dogs; the shafts of the locking pins are provided with axially extending slots and the dogs are formed on radially resilient portions of the shafts; and in the surface of each dog there is provided an axially extending groove, and in each undercut, at the end, there is provided a boss that corresponds with this groove.

With a guide or feeder chain that is constructed pursuant to the inventive teaching, the link members can initially be automatically preassembled to form chain bands that have any desired length and a reliable connection. In so doing, the locking pins already assume an important function, because they ensure a positive interlocking connection that cannot be unintentionally released. With a guide or feeder chain that is constructed pursuant to the teaching of the present invention, it is possible to combine the positive interlocking connection of the link members with a frictional catching arrangement that can be released only intentionally.

It is has proven to be adequate to dispose the undercuts along a peripheral angle of 90°, plus a dog width, in order to ensure a reliable engagement of the locking pin in the manner of a bayonet-type closure.

Further specific features of the present invention will be described in detail subsequently.

DESCRIPTION OF PREFERRED EMBODIMENTS

Referring now to the drawings in detail, the chain links of a guide or feeder chain are comprised of a plurality of link members 1, 2 that mesh with one another where they overlap each other via stop means 3 and recessed portions 4 as well as a joint or pivot journal or lug 5 and a pivot hole 6. For this purpose, to accomplish this, the link member 2 shown on the right side of FIG. 1 must be turned by 180° (see the dot-dash arrows) and must be connected with the link member 1.

At each pivot axis 7, the adjoining link members 1 and 2 are connected in an interlocking manner via a locking pin 8. Each locking pin 8 comprises a shaft 9, on one end of which is formed a disk-shaped head 10, and on the other end of which are formed dogs 11 that project in a radial direction. So that the dogs 11 can yield inwardly, slots 12 that extend in the axial direction and parallel to one another are provided in the shaft 9. The outer surface of each dog 11 is provided with a groove 13 that extends in the axial direction.

Provided in each pivot lug 5, concentric to the pivot axis 7, is a locking hole 14 that has radially extending grooves 15 for the dogs 11. Proceeding from the grooves 15, in the circumferential direction, are undercuts 16, that extend over a peripheral angle of about 90° and at their ends have inwardly directed projections or bosses 17 that can engage or catch in the grooves 13 of the dogs 11.

When two link members 1 and 2 are connected together where they overlap one another, at each pivot axis 7 a locking pin 8 can be introduced and in its end position can be turned by about 90°. In so doing, the dogs 11 are guided into the undercuts 16 and are pressed inwardly somewhat in a radial direction, so that a positive interlocking and at the same time also frictional connection results. The engagement between the grooves 13 and the bosses 17 serves merely to define the end position of the locking pins 8 and also to make this end position recognizable during assembly or removal.

The head 10 of each locking pin 8 is preferably recessed in the chain link 1 or 2; similarly, the dogs 11 are recessed in the undercuts 16. The head 10 is provided with a slot 18 for receiving a screwdriver.

The present invention is, of course, in no way restricted to the specific disclosure of the specification and drawings, but also encompasses any modifications within the scope of the appended claims.

What I claim is:

1. In a guide or feeder chain for power and supply lines, including chain links that each comprise two spaced-apart link members that are disposed parallel to one another and are interconnected by crosspiece means, whereby link members of adjacent chain links, where they overlap, are held against one another by plastic locking pins along pivot axes, the improvement wherein:

said locking pins each comprise a shaft having two ends, on one of which is formed a head, and on the other of which are formed radially projecting dogs that are disposed opposite one another;

each link member, concentric to one of said pivot axes, has a locking hole which has radial grooves for receiving said dogs, with said grooves, on one side of said link member, having undercuts that extend away from said groove in the circumferential direction of said locking hole for receiving said dogs;

said shafts of said locking pins are provided with axially extending slots to form radially resilient shaft portions on which said dogs are formed;

each dog has an outer surface in which is provided an axially extending groove; and each link member, at an end of each of said undercuts remote from said radial grooves thereof, is provided with respective bosses that correspond with said grooves of said dogs.

2. A guide or feeder chain according to claim 1, in which each of said undercuts extends over a peripheral angle of 90° plus the width of one of said dogs 3. A guide or feeder chain according to claim 2, in which said heads of said locking pins are recessed in said link members, and said dogs are recessed in said undercuts of said grooves of said link members.

4. A guide or feeder chain according to claim 3, in which each of said heads of said locking pins is provided with a slot for receiving a screwdriver.

* * * * *